(12) United States Patent
Haas et al.

(10) Patent No.: US 6,796,301 B2
(45) Date of Patent: Sep. 28, 2004

(54) OVEN FOR PRODUCING BAKED MOLDED BODIES

(75) Inventors: Franz Haas, deceased, late of Vienna (AT), by Johann Haas, legal representative; Johann Haas, Klosterneuburg (AT); Fritz Obermaier, Krems (AT)

(73) Assignee: Franz Haas Waffelmaschinen-Industrie Aktiengesellschaft, Vienna (AT)

( * ) Notice: Subject to any disclaimer, the term of this patent is extended or adjusted under 35 U.S.C. 154(b) by 0 days.

(21) Appl. No.: 10/601,633

(22) Filed: Jun. 23, 2003

(65) Prior Publication Data

US 2004/0081934 A1 Apr. 29, 2004

Related U.S. Application Data

(63) Continuation of application No. PCT/AT01/00403, filed on Dec. 21, 2001.

(30) Foreign Application Priority Data

Dec. 22, 2000 (AT) ......................................... 2140/2000

(51) Int. Cl.[7] ................................................. A21B 1/46
(52) U.S. Cl. .................... 126/19 R; 99/443 C; 432/121
(58) Field of Search ............................ 126/19 R, 21 R, 126/21 A, 19 M, 273 R, 41 C; 99/443 C, 443 R, 386; 432/121, 152

(56) References Cited

U.S. PATENT DOCUMENTS

| | | | |
|---|---|---|---|
| 2,112,309 A | * | 3/1938 | Santillan .................... 126/41 C |
| 3,093,062 A | | 6/1963 | Forrester ..................... 99/423 |
| 3,937,852 A | * | 2/1976 | Wolf .......................... 426/560 |
| 3,947,212 A | * | 3/1976 | Griner et al. .............. 99/443 C |
| 4,208,441 A | | 6/1980 | Westover ..................... 99/386 |
| 4,884,552 A | * | 12/1989 | Wells et al. .............. 126/19 R |
| 5,436,432 A | * | 7/1995 | Cyr ........................... 99/443 C |

FOREIGN PATENT DOCUMENTS

| | | | |
|---|---|---|---|
| DE | 464 630 | 8/1928 | |
| DE | 1 076 052 | 2/1960 | |
| DE | 2932156 A1 | 2/1981 | |
| FR | 2 651 093 A1 | 3/1991 | |
| GB | 226793 | 7/1925 | |
| GB | 2 169 186 A | * 7/1986 | ............ A21B/1/00 |

* cited by examiner

Primary Examiner—Josiah Cocks
(74) Attorney, Agent, or Firm—Laurence A. Greenberg; Werner H. Stemer; Gregory L. Mayback

(57) ABSTRACT

A baking oven for producing baked molded bodies has a baking line that extends along a plane from an input station to an output station. The baking molds are each formed of a bottom baking plate and a top baking plate that is set down onto the top surface of the lower baking plate. The baking molds are transported through the baking line by a lower conveyor that carries the lower mold halves. An upper conveyor above the baking line transports the upper mold halves through their path of revolution above the plane of the baking line with the plates suspended and substantially horizontally aligned and with the baking surfaces always facing down. At the beginning of the baking line, the upper conveyor sets the top baking plates, which are substantially horizontally aligned, down onto the bottom baking plates for forming the baking molds, and at the end of the baking line, it lifts them from the bottom baking plates for opening the baking molds. The baking plates have aligning elements that mate with one another when a top baking plate is lowered onto a bottom baking plate and align the top plate during placement on the bottom plate.

13 Claims, 5 Drawing Sheets

OVEN FOR PRODUCING BAKED MOLDED BODIES

CROSS-REFERENCE TO RELATED APPLICATION

This application is a continuation of copending International Application No. PCT/AT01/00403, filed Dec. 21, 2001, which designated the United States and which was not published in English.

BACKGROUND OF THE INVENTION

Field of the Invention

The invention relates to a baking oven for producing baked molded bodies or shaped bodies. The baking oven has an input station for the baking mass, an output station for the baked molded bodies, an elongated baking space, a baking line leading from the input station to the output station through the baking space. Top and bottom baking plates, which revolve in opposite directions on separate paths in the longitudinal direction of the oven and which pass through the baking line in the same direction, and, lying one atop the other in pairs, form the baking molds for the molded bodies that are to be baked.

German patent DE 464 630 and British patent GB 226 793 describe waffle baking machines for producing flat rectangular waffles that are baked in the waffle baking molds, which are formed from a top baking plate and a bottom baking plate and which pass through a U-shaped baking line. In these baking machines, the dough input station is arranged on the front side above the waffle output station, and the U-shaped baking line, which is heated from below along its two horizontal branches, extends from the input station to the output station through the baking machine interior.

The U-shaped baking line extends along the outside of a continuous inner baking plate line whose plates form the bottom baking plates of the waffle molds. The revolving baking plate line transports its plates from the upper input station down to the lower output station through the U-shaped baking line, and from there back up to the upper input station over the return drum of the baking plate line, which is disposed on the front side of the baking machine.

The U-shaped baking line extends along the U-shaped inner path of an outer continuous baking plate line whose plates form the top baking plates of the waffle molds. The revolving outer baking plate line transports its baking plates in its U-shaped inner path from the upper input station down to the lower output station along the outside of the inner baking plate line and through the U-shaped baking line. At the bottom end of the U-shaped baking line, the outer baking plate line is deflected down into its U-shaped outer path by its lower return drum, which is disposed at the output station. This path extends rearward below the baking line along the bottom surface of the baking machine, upward along the back surface of the baking machine, and forward again above the baking line and along the top surface of the baking machine to the upper start of the U-shaped baking line. At the front side of the baking machine, the outer baking plate line is deflected down to the start of its U-shaped inner path at its upper return drum, which is disposed above the input station.

In these baking machines, each waffle mold is heated in the upper horizontal section of the U-shaped baking line only at the bottom baking plate thereof. In passing the rear return of the baking line, the waffle mold is turned on its head, and in the subsequent bottom horizontal portion of the baking line, the waffle mold is heated only at its top baking plate, which is now on the bottom.

In the prior art baking machines, the outer baking plate line contains approximately twice as many baking plates as the inner baking plate line. The plates in the outer baking plate line which are led along the long outer path cool off more intensely than the plates of the inner line, which are merely returned over the front return drum. In the U-shaped baking line, the baking plates of the inner line are heated only in the upper horizontal section of the baking line, and the plates of the outer line are heated only in the lower horizontal section.

The different paths of the two baking plate lines and the limiting of the heating of their baking plates to different parts of the U-shaped baking line leads to large differences in the unavoidable heat-related length changes of the two baking plate lines. The different heat-induced length changes of the two lines can lead to an unwanted shifting of the baking plates in the waffle molds in relation to one another, whereby the waffle pattern, which develops on the upper baking plate, of the top side of the waffle is offset relative to the waffle pattern, which is formed by the bottom baking plate, of the bottom side of the waffle.

In those baking machines, large temperature differences exist between the top and bottom baking plates of the waffle molds upon returning to the input station. At the beginning of the baking line, a relatively intensely cooled top baking plate is folded down to a less intensely cooled and already bottom-heated bottom baking plate. The waffle dough that is spreading on the bottom baking plate comes in contact with the somewhat cooler top baking plate somewhat earlier in the front third of the plate than in the rear third. This leads to local differences in the heating of the waffle dough enclosed between the two baking plates. This can give rise to unwanted irregularities in the color of the surface of the baked waffles.

In those baking machines, the outer baking plate line, with its long length and its U-shaped outer path, creates high costs for the additional baking plates and additional return drums at the rear of the baking machine. The U-shaped course of the baking line makes it economically unfeasible to increase the performance of the baking machine by substantially extending its baking line, which would also create additional problems. In order to extend the baking line, twice as many baking plates would have to be added in the outer baking plate line than in the inner baking plate line. This would further exacerbate the existing differences in the inevitable heat-induced length changes in the two baking plate lines and in the temperatures of the plates at the beginning of the baking line. Given lengthening of the baking line, the speed of revolution of the two baking plate lines would also have to be increased, so that the baking time provided for the waffles matched the transit time of the waffle molds given an extended baking line. But the speed of revolution of the outer baking plate line can only be increased to a limited degree owing to its five deflections.

German published, non-prosecuted patent application DE 29 32 156 describes a system for simultaneously producing circular, cloverleaf-shaped, and heart-shaped waffles in three adjacent longitudinal rows. A continuous steel band which revolves in this apparatus is constructed as a template having three punched holes corresponding to the respective waffle shape arranged adjacent one another in three longitudinal rows, in which the waffles emerge and remain stuck until being pushed out of the punched holes by the ejector cams protruding from the rear return drum of the steel band, which correspond to the respective waffle shape and which engage in the punched holes of the steel band.

In that prior art apparatus, the top horizontal section of the steel band passes between two opposing housings, in each of which there are disposed three continuous mold lines, which consist of linked baking mold parts that revolve above and below a longitudinal row of punched holes, respectively. In the outer sections of the mold lines, which face away from the steel band, the mold parts are heated. In the inner sections of the mold lines, which face toward the steel band, the baking mold parts cover the punched holes of the relevant longitudinal row on the top and bottom sides of the band, respectively.

In that apparatus, the dough portions are inserted into the punched holes of the revolving steel band by stationary dressing nozzles, while the bottom sides of the punched holes are covered by the hot baking mold parts of the revolving bottom mold lines but before the top sides of the punched holes are covered by the hot baking mold parts of the revolving top molding line. The flat waffles emerge in the punched holes when these are covered on the top and bottom by the hot baking mold parts, and when the baking mold parts of their mold lines are taken off the top and bottom sides of the steel belt, the edges of the waffles remain stuck to the edges of the punched holes. The revolving steel belt transports the finished waffles that remain stuck in its punched holes to the discharge station at the rear return drum of the steel belt, where the ejector cams engage in the punched holes and push the waffles up and out of the punched holes.

The steel band that is provided with the punched holes serves not only as a template for producing the waffles but also as a conveyor belt for the finished waffles, which remain in the punched holes while the steel band transports the waffles first through a dressing station in which gingerbread dough portions are deposited on the waffles and then through a molding station in which mold stamps are pressed onto the gingerbread dough portions, which give the dough portions the desired shape and distribute them across the respective waffle.

In that apparatus, the three upper mold lines which are adjacently arranged on the top side of the steel band revolve in the direction opposite the direction of rotation of the lower mold lines, which are adjacently arranged beneath the steel band. The sections of the top and bottom mold lines which face one another are separated by the steel band. The apparatus comprises three adjacently arranged longitudinal rows of waffle baking molds, in which the punched holes in the steel band form the main part of all waffle baking molds, whereas the baking mold parts of each individual molding line form the top and bottom lids of the waffle molds only in a single longitudinal row of waffle baking molds, respectively.

SUMMARY OF THE INVENTION

It is accordingly an object of the invention to provide a machine for producing baked shaped bodies which overcomes the above-mentioned disadvantages of the heretofore-known devices and methods of this general type and which provides for an improved baking oven in which the baking plates are placed on top of one another evenly in the forming of the baking molds, and which makes it possible to easily increase its performance by lengthening its baking line while simultaneously increasing the speed of revolution of the baking plates.

With the foregoing and other objects in view there is provided, in accordance with the invention, a baking oven for producing baked molded bodies, comprising:

an oven having a planar baking line extending in a longitudinal direction thereof from an input station to an output station through an elongated baking space;

a plurality of baking molds for moving along the baking line from the input station to the output station, the baking molds comprising top baking plates and bottom baking plates lying on top of one another in pairs, with baking surfaces of the top and bottom baking plates respectively defining top and bottom surfaces of the molded bodies baked in the baking molds;

a lower conveyor defining a lower path of revolution with an upper run extending along the baking line, the lower conveyor transporting the baking molds from the input station through the baking line to the output station and transporting only the bottom baking plates back from the output station to the input station, the lower conveyor carrying the bottom baking plates along the lower path of revolution;

an upper conveyor defining an upper path of revolution with a lower run extending along the baking line, the upper conveyor lowering the top baking plates onto the bottom baking plates supported on the lower conveyor at a beginning of the baking line to form the baking molds, and transporting only the top baking plates back from the output station to the input station, the upper conveyor moving the top baking plates, with the plates suspended and the upper baking surfaces facing down, along the upper path of revolution; and aligning elements mounted to the top and bottom baking plates for engaging one another as the top baking plates are lowered onto the underlying bottom baking plate, to thereby align the top baking plate and the bottom baking plate.

The proposed solution is a baking oven for producing baked molded bodies which has an input station, an output station, an elongated baking space, a baking line leading from the input station to the output station through the baking space, and top and bottom baking plates which revolve in opposite longitudinal directions on separate paths, which pass through the baking line in the same direction and, lying one atop the other in pairs, form the baking molds for the molded bodies that are to be baked. This baking oven is inventively characterized in that a baking line is provided extending from the input station to the output station in one plane; that the baking molds respectively consist of a bottom baking plate and a top baking plate which is set down on its top surface; that a lower conveyor which bears the bottom baking plates is arranged along their path of revolution below the plane of the baking line and transports the baking molds from the input station to the output station through the baking line; that an upper conveyor extends along the path of revolution of the top baking plates above the plane of the baking line, which transports the top baking plates suspended substantially horizontally with their baking surfaces constantly down—whereby the top conveyor lowers the substantially horizontally aligned top baking plates onto the bottom baking plates at the beginning of the baking line for purposes of forming the baking molds and lifts them from the bottom baking plates at the output station for purposes of opening the baking molds; and that the top and bottom baking plates bear mutually allocated aligning elements which engage when a top baking plate is lowered onto a bottom baking plate and which align the top baking plate during its placement onto the underlying bottom baking plate.

In the inventive baking oven, the upper conveyor sets down the top baking plates it carries overhead on the bottom baking plates at the beginning of the baking line and, when the top baking plates are sitting on the bottom baking plates, it releases them. The lower conveyor transports the baking molds formed from the bottom baking plates and the top baking plates that have been placed on them through the baking line. At the end of the baking line, the upper conveyor picks up the top baking plates which have been set on the bottom baking plates and lifts them off of the bottom baking plates. This opens the baking molds, and the molded bodies baked therein are discharged or removed from the baking molds. From the end of the baking line, the top baking plates are transported back to the beginning of the baking line while oriented substantially parallel to the plane of the baking line, where the upper conveyor sets them on the baking plates of the lower conveyor again, transferring them thereto.

In the baking oven according to the invention, in the handover of the top baking plates to the baking plates of the lower conveyor, the top plates are set down on the bottom baking plates with the bottom plates in the plane of the baking line and with the top plates aligned substantially parallel to the plane of the baking line. In each individual baking mold, the downward facing baking surface of the top baking plate is set perpendicular to the plane of the baking line onto the top side of the dough mass, i.e. the baking mass, lying on the upward facing baking surface of the bottom baking plate. When the top baking plate is lowered, its aligning elements engage the aligning elements of the underlying bottom baking plate. The dropping top baking plate automatically aligns itself to the bottom baking plate as it is lowered. The top baking plate, now released from the upper conveyor, lies in the position on the bottom baking plate determined by the aligning elements of the two baking plates. This aligning process is controlled by the aligning elements of the baking plates in each individual baking mold. Slight longitudinal shifts of the top baking plates relative to the bottom baking plates, which can be caused by different heat-related length changes of the two conveyors, are also compensated by the aligning process in the lowering of the top baking plate onto the bottom baking plate. The inventive development of the baking oven allows the baking oven to be easily adjusted to the respectively desired performance. In both the upper and lower conveyors, the number of baking plates can be easily increased by the linear extending of the respective conveyor, and the speed of revolution of the baking plates can be adapted to the extended baking line without causing additional problems.

According to an added feature of the invention, the upper conveyor has hangers for the top baking plates which revolve in the longitudinal direction of the oven; said hangers consisting of an upper hanger and, detachably connected thereto, a lower hanger, whereby the upper hangers revolve along a self-contained path, and the lower hangers are fixed to the top baking plates; and the path of revolution of the upper hangers descends along the baking line toward the bottom baking plates, with the lower hangers of top baking plates that have been set on the bottom baking plates being lifted by the upper hangers.

According to an additional feature of the invention, the upper hangers can be fastened to a transport chain that revolves in the longitudinal direction of the baking oven and can comprise bearing elements that are horizontally aligned in the transverse direction of the oven for engaging the bearing elements of the lower hangers.

According to another feature of the invention, the upper conveyor can have two sets of hangers that revolve parallel to one another in the longitudinal direction of the oven, each of which is fixed to a continuous transport chain that revolves in a vertical plane.

According to a further feature of the invention, the upper conveyor can comprise two sets of hangers that revolve parallel to one another in the longitudinal direction of the oven, whose lower hangers are fixed to the top baking plates and whose upper hangers are attached to bearing bars which are aligned horizontally in the transverse direction of the oven and which are fixed to lateral transport chains that revolve in a vertical plane in the longitudinal direction of the oven.

According to yet an added feature of the invention, the bearing elements of the upper hangers can be constructed as horizontally aligned bearing bolts which are grasped from above by the bearing elements of the lower hangers.

According to yet an additional feature of the invention, the lower hanger can have a vertically aligned bearing plate in which a laterally open recess is provided, at an upper protrusion of which the bearing element of the lower hanger is arranged, and the bearing element of the upper hanger can be realized as a horizontal bearing bolt which is received in the laterally open recess of the lower hanger with vertical play.

According to yet another feature of the invention, the bearing element of the lower hanger can be realized as a horizontal bearing bolt which is received in a laterally open recess of the upper hanger, and the upper hanger can comprise a vertical bearing plate in which a laterally open recess is provided, at whose lower protrusion the bearing element of the upper hanger is arranged.

According to a concomitant feature of the invention, the aligning elements of the top baking plates can be realized as horizontal aligning bolts extending transverse to the oven which engage in the vertical receiving slots, which are provided with insertion slants, of the aligning elements of the bottom baking plates in the setting of the top baking plates.

Other features which are considered as characteristic for the invention are set forth in the appended claims.

Although the invention is illustrated and described herein as embodied in an oven for producing baked molded bodies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
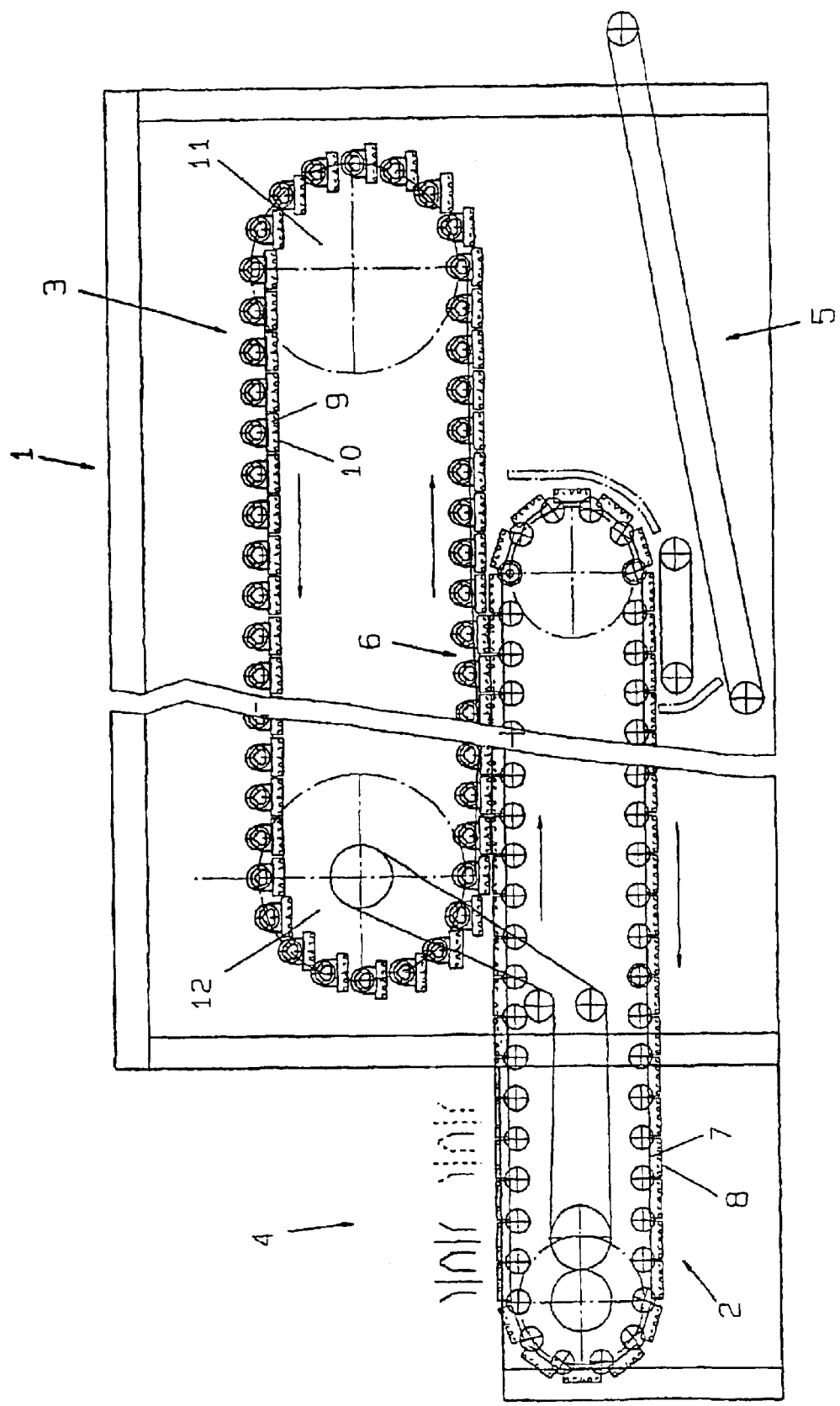
FIG. 1 is a schematic side view of a baking oven assembly according to the invention.
Figure 2:
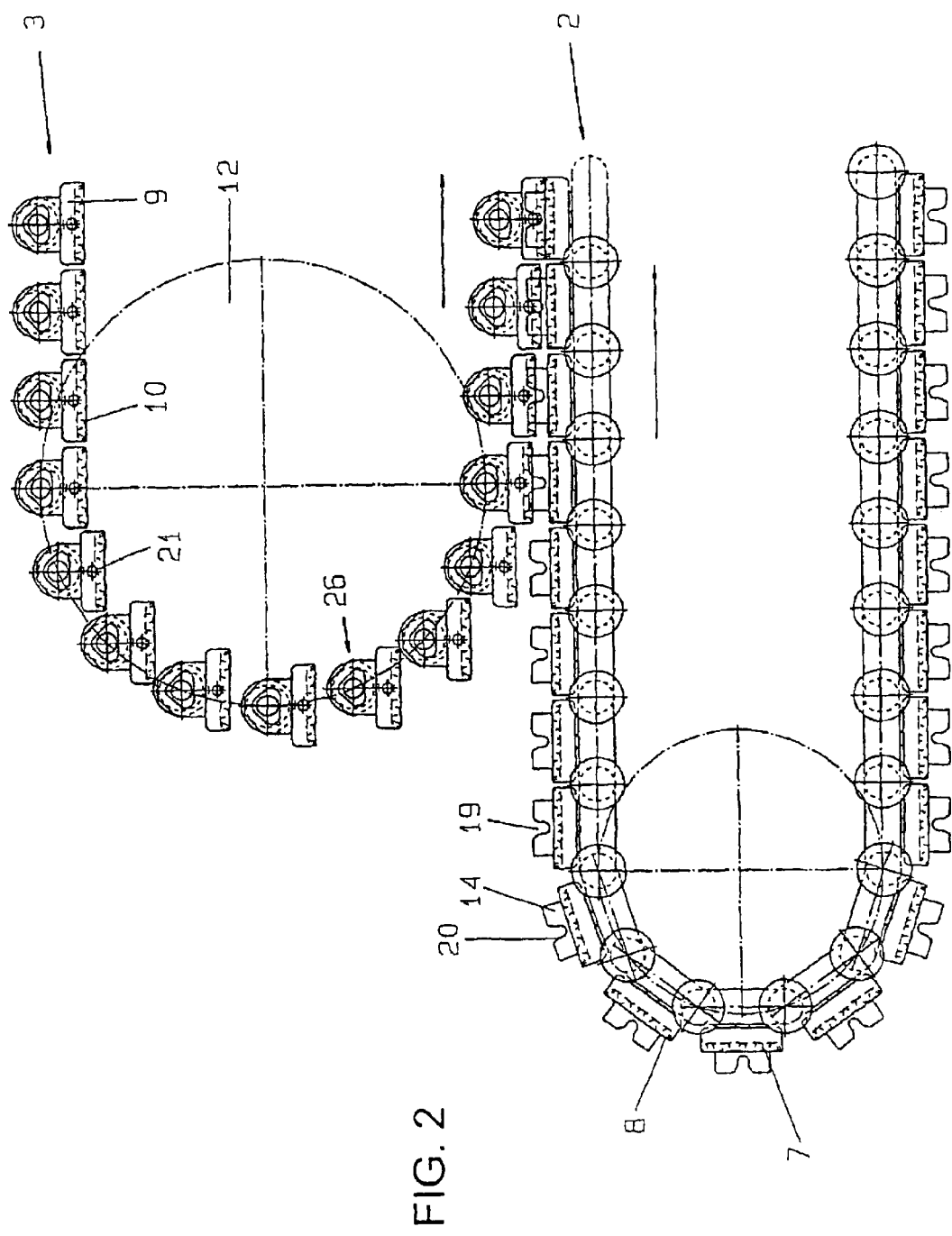
FIG. 2 a schematic side view of the front end of the baking oven according to the invention.
Figure 3:
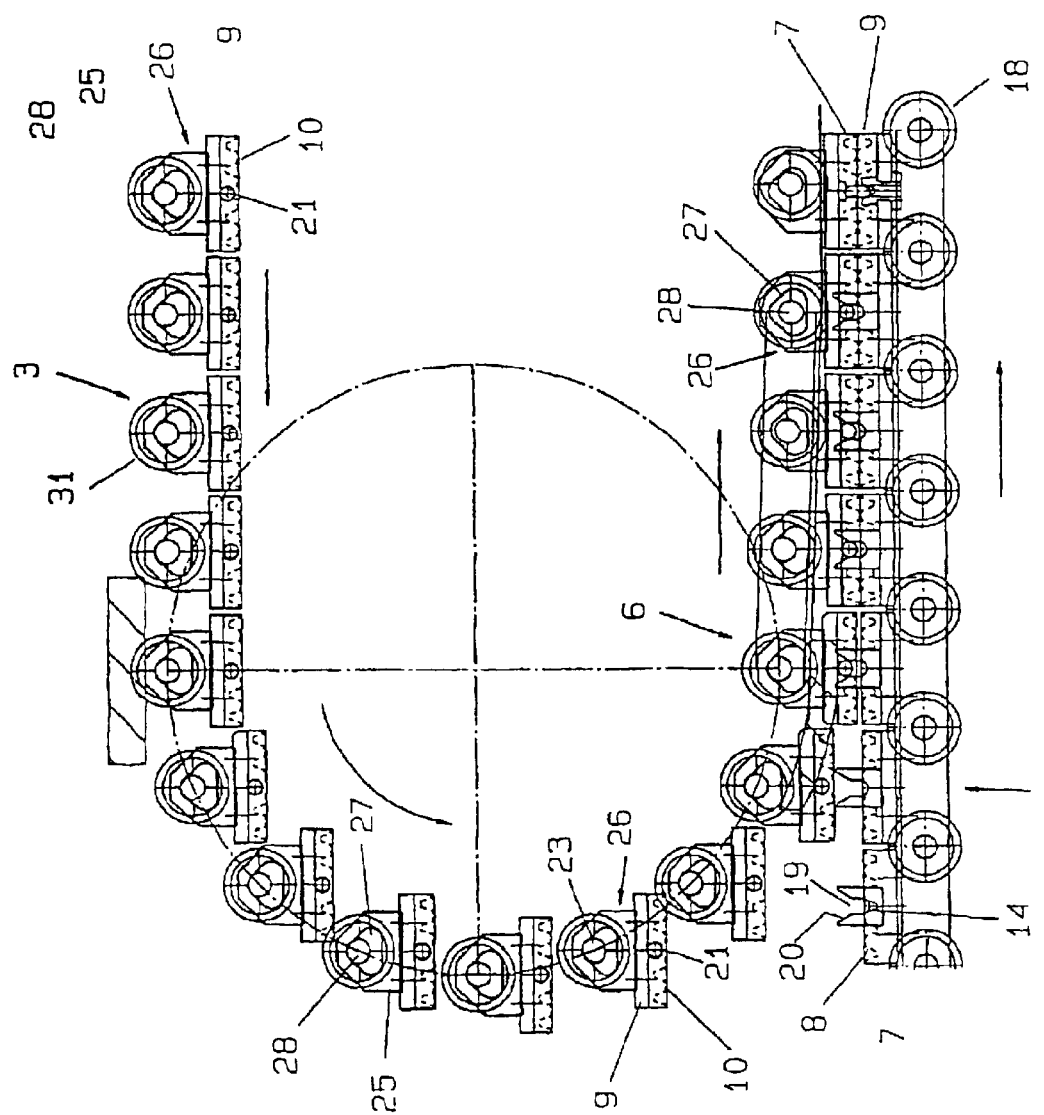
FIG. 3 is a schematic side view of the beginning of the baking line of an oven according to the invention.

Referring now to the figures of the drawing in detail and first, particularly, to FIG. 1 thereof, there is shown an elongated baking oven 1 in which a baking line 6 or baking path 6 is provided between a lower conveyor 2 and an upper conveyor 3. The conveyors 2 and 3 extend horizontally between a front feed or input station 4 of the oven 1 to a rearward delivery or output station 5 through its elongated baking space.

The lower conveyor 2 transports bottom baking plates 7 along its endless path of revolution through the oven 1. The bottom baking plates 7 are configured consecutively in the longitudinal direction of the oven 1 along their path of revolution with their baking surfaces 8 facing out. The lower conveyor 2 transports the bottom baking plates 7 through the baking line 6 rearward to the output station 5 in its upper branch and forward to the input station 4 again below the baking line 6 in its lower branch.

The top baking plates 9 are arranged consecutively in the longitudinal direction of the oven 1 along their path of revolution with their baking surfaces 10 facing down. The top baking plates 9, i.e., the upper mold halves 9, are lowered onto the bottom baking plates 7, i.e., the lower mold halves 7, by the upper conveyor 3 at the beginning of its lower run and transported rearward to the output station 5 through the baking line 6 by the lower conveyor 2. Subsequent to the output station 5, the top baking plates 9 are once more taken by the upper conveyor 3, which transports them to its rear return 11 in its lower run and by way of the return into its upper run, which is arranged above the baking line 6. In the upper run or race, the upper conveyor 3 transports the top baking plates 9 in suspended fashion forward to its front return 12 and by way thereof back to the beginning of the baking line 6.

Prior to entering the baking line 6, the horizontally aligned top baking plates 9 are set on the horizontally aligned bottom baking plates 7 from above. Lateral aligning elements 13 of the respective top baking plate 9 thereby engage the lateral aligning elements 14 of a respective bottom baking plate 7, and the top plate automatically aligns itself relative to the bottom plate. By this process, the mutual positions of the opposing baking surfaces 8, 10 of the two stacked baking plates 7, 9 are determined independently of external influences.

In order to produce the baked molded bodies, the dough portions provided for the molded bodies are deposited on the baking surfaces 8 of the bottom baking plates 7 in liquid or easily flowable batter form or as elastic kneadable dough pieces at the input station 4 of the oven 1 by a charging device which is not represented. With the lowering of the top baking plates 9 onto the bottom baking plates 7, the dough portions are enclosed in the emerging baking molds formed by the stacked baking plates 7, 9, respectively. The dough portions are transported through the baking line 6 in the baking molds, whereby molded bodies emerge which have been baked from the dough portions by the baking process, and the shape of their top and bottom surfaces having been defined by the baking surfaces of the stacked baking plates 7, 9. At the output station 5 of the baking oven 1, the top baking plates 9 are picked up by the lower branch of the upper conveyor 3 and lifted from the bottom baking plates 7. This opens the baking molds containing the baked molded bodies. The baked molded bodies remain on the bottom baking plates 7 and can be removed when these pass through the rear return 15 of the lower conveyor 2.

The opposing baking surfaces 8,10 of the top and bottom baking plates 7,9 can form several consecutive baking molds separated by cross-ridges, so that several molded bodies simultaneously emerge between two stacked baking plates 7,9, which molded bodies are consecutively arranged and fill the respective baking mold. The opposing baking surfaces 8,10 of the top and bottom baking plates 7,9 can also form a single mold cavity in which several dough portions that are arranged consecutively at intervals are baked into separate molded bodies.

Figure 4:
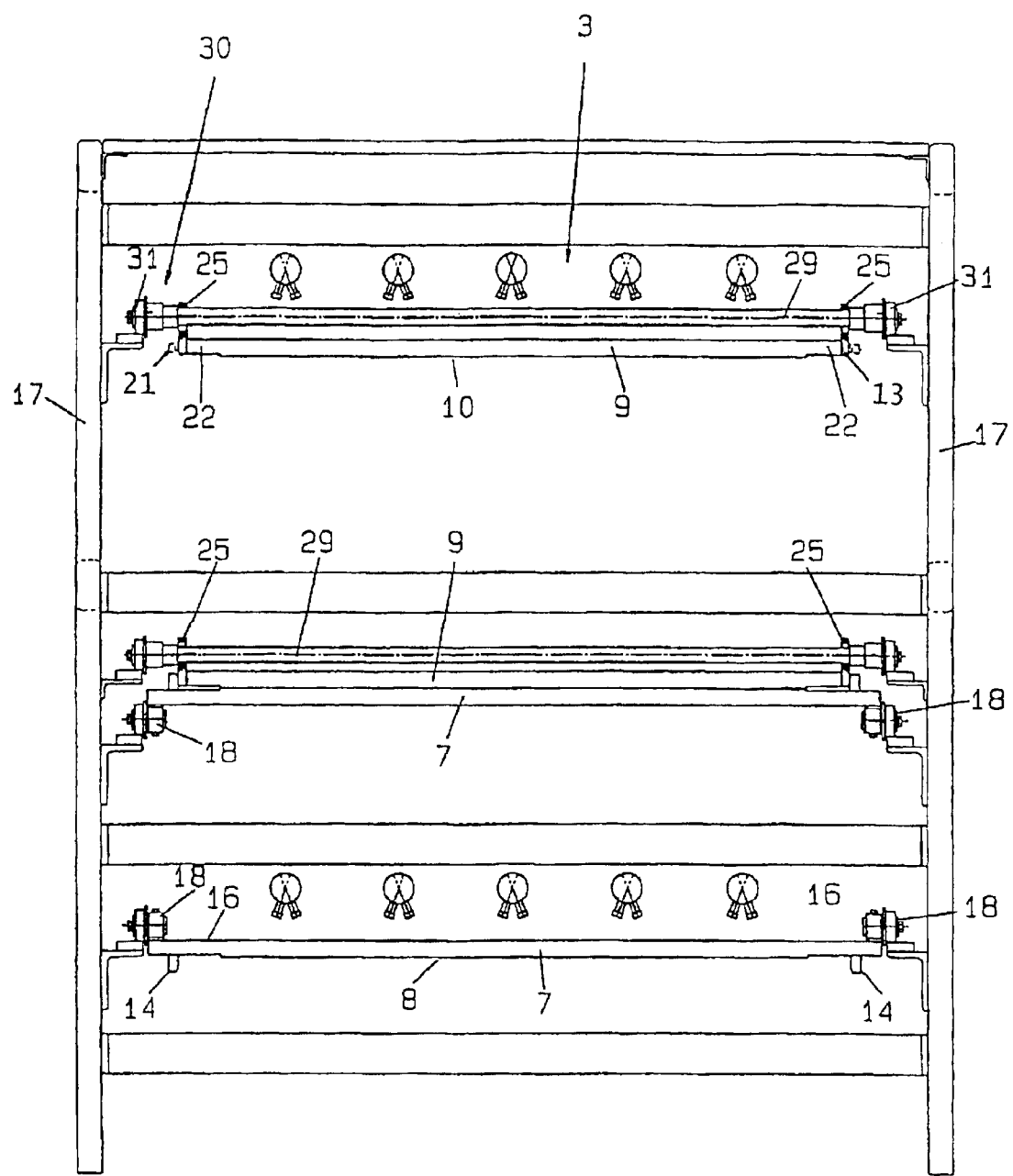
FIG. 4 is a cross-section through an inventive oven.
Figure 5:
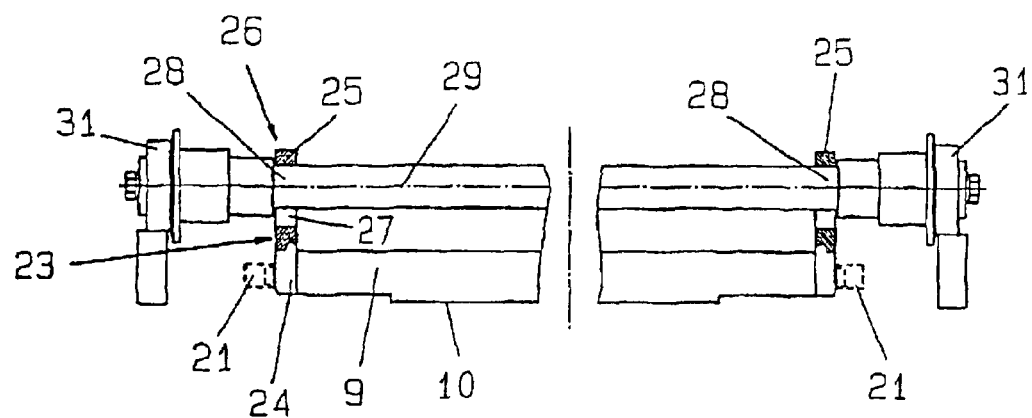
FIG. 5 is a schematic view of a first embodiment of the suspensions of the top baking plates.

As shown in FIG. 4, the bottom baking plates 7 comprise bearing plates 16 protruding laterally beyond their baking surfaces 8, with which they are fixed to the lower transport chains 18 that revolve along the sidewall 17 of the oven 1. Arranged at these bearing plates 16 are the aligning elements 14 of the bottom baking plates 7, whereby each aligning element 14 provides a longitudinal slit 19 which is open toward the outside of the path of revolution of the bottom baking plates 7 and which is provided with insertion ramps 20 at its entry side. Aligning bolts 21 on both sides of the baking surfaces 10 of the top baking plates 9 are allocated to the longitudinal slits 19 on both sides of the baking surfaces 8 of the bottom baking plates 7. These aligning bolts 21 are aligned horizontally transverse to the transport direction of the baking plates 7,9 and form the lateral aligning elements 13 of the top baking plates 9.

The top baking plates 9 comprise bearing portions 22 protruding laterally beyond their baking surfaces 10 with vertical bearing plates 23 fixed at their outer free ends, the bottom end portions 24 of which plates protrude down beyond the particular top baking plate 9. A top portion 25 of the respective vertical bearing plates 23 rises beyond the appertaining top baking plate 9. This top portion 25 is constructed as the lower portion of a two-part hanger 26 and contains a laterally open recess 27 in which the upper part of the two-part hanger 26, constructed as bearing bolt 28, engages. The bearing bolt 28 is formed by a lateral portion of a horizontal bearing bar 29 of the upper conveyor 3, whose horizontal bearing bars 29 revolve in the longitudinal direction of the oven 1. The two lateral end portions 30 of these bearing bars 29 are fixed to the two upper transport chains 31 of the baking oven 1, respectively, which revolve along the sidewalls 17 of the oven 1.

At each lateral end of a top baking plate 9, the upper portion 25 of the vertical bearing plate 23 forms the lower hanger 25, which is fixed to this top baking plate 9, of a two-part hanger 26, the upper hanger 28 being formed by the bearing bolt 28 that is received in the laterally open recess 27 of the lower hanger 25. The bolt sits on a revolving bearing bar 29 of the upper conveyor 3. The laterally open recesses 27 of the lower hanger 25 are triangular and are provided with rounded corners. The bearing bolts 28 of the upper hanger 28 that engage in these recesses 27 have a substantially smaller cross-section than these recesses 27.

The lateral portions, which are constructed as bearing bolts, of the bearing bars 29 of the upper conveyor 3 that are fixed to the upper transport chain 31 form the upper hanger of the two-part hanger 26, whereas the lower hanger is attached to the top baking plates 9 laterally and comprises a recess 27 that wraps around the bearing bolt 28 of the upper hanger with play. In the upper branch of the upper conveyor 3, the lower hangers 25 are in contact with the upper hangers 28, and the top baking plates 9 are suspended freely at the bearing bars 29 of the upper conveyor 3. Along the baking line 6, the lower hangers 25 of the top baking plates 9 are lifted by the upper hangers 28 that are constructed on the bearing bars 29.

FIG. 4 represents a cross-section through the baking oven with its two sidewalls 17 and the upper conveyor 3 which is arranged above the lower conveyor, and whose hangers, each of which consists of a lower hanger 25 fixed to a top baking plate 9 and an upper hanger attached to a horizontal bearing bar 29 of the upper conveyor, revolve in parallel fashion in two sets arranged next to one another in the longitudinal direction of the oven.

Figure 6:
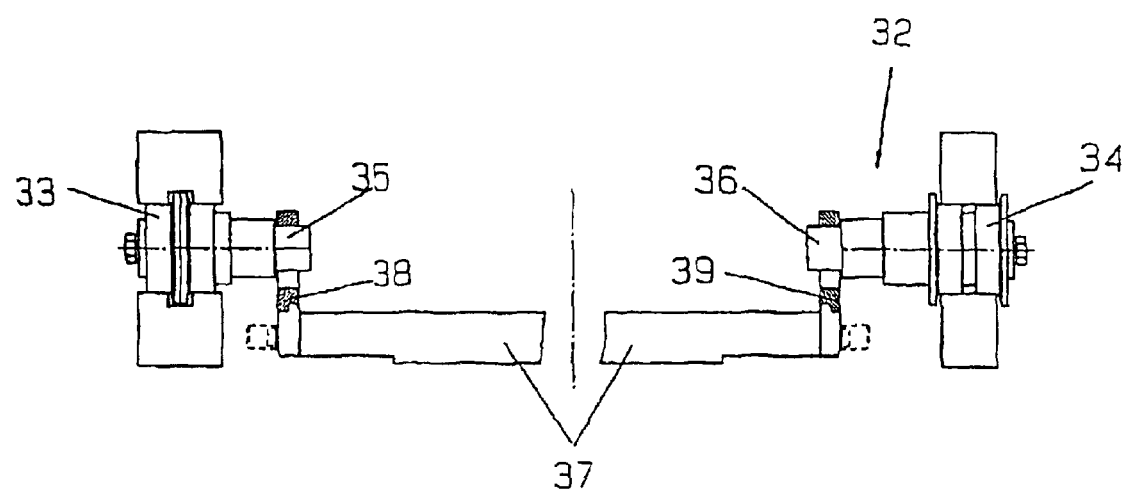
FIG. 6 is a schematic view of a second embodiment of the suspensions of the top baking plates.

FIG. 6 represents the upper portion of an upper conveyor 32 with two sets of hangers which revolve adjacent one another in two parallel vertical planes. Allocated to each set of hangers is a continuous transport chain 33, 34 whose links are secured against tilting and bear horizontally aligned bearing bolts 35, 36, respectively. These bearing bolts 35, 36 respectively form the upper hanger of a two-part hanger. The lower hangers 38, 39 are fastened to the two lateral end portions of a top baking plate 37. These sit on the upper hangers, which are formed by the bearing bolts 35, 36, in the upper branch of the upper conveyor 32 represented in FIG. 6, so that the top baking plate 37 in the upper branch of the upper conveyor 32 is freely suspended on the two bearing bolts 35, 36. In the lower branch of the upper conveyor 32, which is not represented in FIG. 6, the lower hangers 38, 39 that are fastened laterally to the top baking plates 37 are lifted by the upper hangers that are formed by the bearing bolts 35, 36.

The hangers, which consist of an upper hanger and a lower hanger, respectively, are two-piece suspension mechanisms with which the top baking plates are freely suspended above their center of gravity in the upper conveyor, so that their baking surfaces always face down under the effect of gravity, and so that the plates travel through their path of revolution aligned horizontally, i.e. parallel to the plane of the baking line.

We claim:

1. A baking oven for producing baked molded bodies, comprising:
   an oven having a planar baking line extending in a longitudinal direction thereof from an input station to an output station through an elongated baking space;
   a plurality of baking molds for moving along said baking line from the input station to the output station, said baking molds comprising top baking plates and bottom baking plates lying on top of one another in pairs, with baking surfaces of said top and bottom baking plates respectively defining top and bottom surfaces of the molded bodies baked in said baking molds;
   a lower conveyor defining a lower path of revolution with an upper run extending along said baking line, said lower conveyor transporting said baking molds from the input station through said baking line to the output station and transporting only said bottom baking plates back from the output station to the input station, said lower conveyor carrying the bottom baking plates along the lower path of revolution;
   an upper conveyor defining an upper path of revolution with a lower run extending along said baking line, said upper conveyor lowering said top baking plates onto said bottom baking plates supported on said lower conveyor at a beginning of said baking line to form said baking molds, and transporting only said top baking plates back from the output station to the input station, said upper conveyor moving said top baking plates, with said plates suspended and said upper baking surfaces facing down, along said upper path of revolution; and
   aligning elements mounted to said top and bottom baking plates for engaging one another as said top baking plates are lowered onto said underlying bottom baking plate, to thereby align said top baking plate and said bottom baking plate.

2. The baking oven according to claim 1, which comprises horizontal bearing bars consecutively disposed on said upper conveyor in the longitudinal direction, and lateral hangers suspending said top baking plates from said horizontal bearing bars, each of said lateral hangers comprising an upper hanger part attached to said bearing bar and a lower hanger part detachably linked to said upper hanger part, said lower hanger part being attached to a respective said top baking plate, wherein said bearing bars are fastened to two continuous transport chains revolving in the longitudinal direction, and said lower run of said upper path of revolution drops along said baking line toward said bottom baking plates, so that said lower hangers of said top baking plates that have been set down on said bottom baking plates are lifted off from said upper hangers passing through said lower run of said upper path of revolution.

3. The baking oven according to claim 2, wherein said bearing bars are bearing bolts said upper hanger parts are formed by portions of said bearing bolts, and said lower hanger parts are formed with laterally open recesses for receiving said bearing bolts with vertical play.

4. The baking oven according to claim 3, wherein each lower hanger part is formed with a vertically aligned bearing plate with said laterally open recess, and said recess includes an upper protrusion forming said bearing element of said lower hanger part.

5. The baking oven according to claim 1, wherein:
   said upper conveyor includes hangers disposed adjacent one another in pairs and in succession in the longitudinal direction, and said hangers are borne by two continuous transport chains revolving in the longitudinal direction;
   each said hanger includes an upper hanger part attached to a respective said transport chain and a lower hanger part detachably coupled with said upper hanger part and attached to a respective said top baking plate;
   each said top baking plate is suspended at two mutually adjacent hangers, and said lower run of said upper conveyor drops along said baking line toward said bottom baking plates; and
   said lower hanger parts of said top baking plates that have been set down on said bottom baking plates are lifted from said upper hanger parts while passing through said lower run.

6. The baking oven according to claim 5, wherein said upper hanger parts are formed by horizontally aligned bearing bolts fastened to said transport chains, and said lower hanger parts are formed with laterally open recesses in which said bearing bolts are received with vertical play.

7. The baking oven according to claim 6, wherein each said lower hanger part comprises a vertically aligned bearing plate in which said laterally open recess is formed, and said recess comprises an upper protrusion forming a bearing element of said lower hanger.

8. The baking oven according to claim 1, wherein said upper conveyor includes hangers revolving along said upper path of revolution in the longitudinal direction, each of said hangers including an upper hanger part borne by said upper conveyor and a lower hanger part loosely coupled with said upper hanger part and fastened to a respective said top baking plate, wherein said lower run of said upper path of revolution along the baking line drops toward said bottom baking plates, and said lower hanger parts of said top baking plates that have been lowered onto said bottom baking plates are taken off the upper hanger parts while passing though said lower run.

9. The baking oven according to claim 8, wherein said upper hanger parts are fastened to a continuous transport chain revolving in the longitudinal direction and comprising bearing elements for said lower hanger parts.

10. The baking oven according to claim 9, wherein said bearing elements of said upper hanger parts are constructed as horizontally aligned bearing bolts and said bearing elements of said lower hangers wrap around said bearing bolts from above.

11. The baking oven according to claim 9, wherein said bearing elements of said upper hanger parts are constructed as horizontally aligned bearing bolts received, with vertical play, in laterally open recesses formed in said lower hanger parts fastened to said top baking plates.

12. The baking oven according to claim 11, wherein said lower hanger parts comprise bearing plates protruding upwardly from said top baking plates, and said bearing plates are formed with a respective laterally open recess receiving a bearing bolt of an upper hanger with vertical play and which comprises an upper protrusion forming a bearing element of the respective said lower hanger part.

13. The baking oven according to claim 1, wherein said aligning elements of said top baking plates are formed of aligning bolts aligned horizontally transverse to a direction of revolution, and said aligning elements of said bottom baking plates are formed with vertically aligned receiving slits and insertion ramps, and wherein said aligning bolts of said top baking plates engage in said receiving slits of said bottom baking plates when said top baking plate is lowered onto the respectively underlying bottom baking plate, and said to baking plate is thereby aligned with said bottom baking plate.

* * * * *